United States Patent [19]
Eberspacher

[11] Patent Number: 5,860,785
[45] Date of Patent: Jan. 19, 1999

[54] TOWING VEHICLE FOR MANEUVERING AIRCRAFT

[75] Inventor: Uwe Eberspacher, Memmingen, Germany

[73] Assignee: Goldhofer Fahrzeugwerk GmbH & Co., Memmingen, Germany

[21] Appl. No.: 737,151

[22] PCT Filed: Apr. 28, 1995

[86] PCT No.: PCT/EP95/01616

§ 371 Date: Nov. 4, 1996

§ 102(e) Date: Nov. 4, 1996

[87] PCT Pub. No.: WO95/29845

PCT Pub. Date: Nov. 9, 1995

[30] Foreign Application Priority Data

May 2, 1994 [DE] Germany ............... 44 15 405.4

[51] Int. Cl.$^6$ ............................................. B64F 1/22
[52] U.S. Cl. ..................... 414/428; 414/429; 244/50; 180/904
[58] Field of Search ................... 414/563, 426, 414/427, 428, 429, 430, 459, 460, 451, 589, 590, 743, 741; 280/402; 180/904; 244/50; 254/3 R, 8 R, 9 R

[56] References Cited

U.S. PATENT DOCUMENTS

| | | |
|---|---|---|
| 4,917,563 | 4/1990 | Pollner et al. . |
| 5,013,205 | 5/1991 | Schardt ................................. 414/429 |
| 5,051,052 | 9/1991 | Franken et al. . |
| 5,259,572 | 11/1993 | Franken et al. . |
| 5,308,212 | 5/1994 | Pollner et al. ......................... 414/428 |
| 5,336,037 | 8/1994 | Cürten et al. . |
| 5,480,274 | 1/1996 | Franken et al. ......................... 414/429 |
| 5,549,436 | 8/1996 | Fresia ................................. 414/427 X |

FOREIGN PATENT DOCUMENTS

| | | |
|---|---|---|
| 3837151 | 5/1990 | Germany . |
| 4102861 | 8/1992 | Germany . |

OTHER PUBLICATIONS

"PTS–1—Safety Features", Krauss–Maffei, Munich, Jun. 1992.
Prospectus, "PTS–Plane Transport System", Krauss–Maffei, Sep. 1991.
PTS Newsletter, No. 6, Krauss–Maffei, Aug., 1987.
Prospectus of Hänchen Company, Shaft Security Clamp Fixing.

*Primary Examiner*—Frank E. Werner
*Attorney, Agent, or Firm*—Brooks & Kushman P.C.

[57] ABSTRACT

In a towing vehicle (1) for manoeuvring aircraft (11) without a towbar, the chassis (5) of which vehicle has a fork-like receiving area (7) between the wheels (6) of a coaxial wheel suspension, in which receiving area there is arranged a retractable and extensible gripping and drawing-in device (9) which is fastened to a lifting blade (8) and by means of which the nosewheel (10) of an aircraft (11) can be gripped and drawn onto the lifting blade (8) which is pivotable relative to the chassis (5) both about a transverse axis and, for matching to oblique positions of a nosewheel (10) which has been received, about a longitudinal axis by means of two fluid piston-cylinder units (12) arranged symmetrically relative to one another between the chassis (5) and the lifting blade (8), the lifting blade (8) is coupled so as to be pivotable in all directions by means of a ball joint (25) which is fastened to the chassis (5) of the towing vehicle (1) and acts centrally on the back of the lifting blade (8). Furthermore at least one fluid piston-cylinder unit (12), acting on the lifting blade (8) above or below the ball joint (25) at a distance from the latter, can be locked and released in a position which raises the lifting blade (8).

9 Claims, 9 Drawing Sheets

TOWING VEHICLE FOR MANEUVERING AIRCRAFT

The invention relates to a towing vehicle for maneuvering aircraft without a towbar, the chassis of which vehicle has a fork-like receiving area between the wheels of a wheel axle, in which receiving area there is arranged a retractable and extensible gripping and drawing-in device which is fastened to a lifting blade and by means of which the nosewheel of an aircraft can be gripped and drawn onto the lifting blade which is pivotable relative to the chassis both about a transverse axis and, for matching to oblique positions of a nosewheel which as been received, about a longitudinal axis by means of two fluid piston-cylinder units arranged symmetrically relative to one another between the chassis and the lifting blade.

A towing vehicle of this design is known (DE-A 38 01 855), in which the lifting blade is arranged on the chassis in such a way that it can be raised, lowered and optionally tilted onto an angular position by means of lower and upper longitudinal coupling rods and can be actuated by means of fluid piston-cylinder units, the upper and lower longitudinal coupling rods forming a linkage which is coupled at one end to the chassis and at the other end to the blade. In order to allow the lifting blade to adapt automatically to any inclination of the nosewheel, the directions in which the upper longitudinal coupling rods act should intersect on an imaginary longitudinal axis at a point forming a pendulum point of the lifting blade. In this case, the longitudinal coupling rods can be designed as fluid piston-cylinder units which are connected to one another in a communicating manner with regard to their fluid, for automatic adjustment of the angular position of the lifting blade, under the influence of the nosewheel of the aircraft transported, when cornering. In the event of a loss of fluid as a result of leakage in the hydraulic system or a rupture of a hydraulic hose, a sudden lowering of the lifting blade may disadvantageously take place with probable damage to the nosewheel or its suspension on the aircraft. Furthermore, it is complicated to use two upper longitudinal coupling rods whose directions of action have to intersect on the imaginary longitudinal axis at a point forming a pendulum point of the blade.

In comparison thereto, the object on which the invention is based is to provide a towing vehicle of the construction mentioned at the beginning, which allows upper longitudinal coupling rods to be dispensed with, and in which any leakage in the fluid supply can no longer have the consequences mentioned for the two fluid piston-cylinder units.

According to the invention, this object is achieved in the towing vehicle mentioned at the beginning, in that the lifting blade is coupled so as to be pivotable in all directions by means of a ball joint which is fastened to the chassis of the towing vehicle and acts centrally on the back of the lifting blade, and in that at least one fluid piston-cylinder unit, acting on the lifting blade above or below the ball joint at distance from the latter, can be locked and released in a position which raises the lifting blade.

The use of a ball joint instead of two specifically arrange longitudinal coupling rods leads to a particularly simple and sturdy, uncomplicated construction which nevertheless guarantees the required degree of freedom of the lifting blade. In this case, although the lifting blade can no longer be raised as a whole, this is not even necessary; it is already sufficient for the fluid piston-cylinder unit to tilt the lifting blade when it is acted upon by pressurized fluid, the lower region of the lifting blade rising, as a result of which the nosewheel resting on it is also raised. The lifting blade is thus tilted in this case about a transverse axis passing through the centerpoint of the ball joint.

Since the at least one fluid piston-cylinder unit is mechanically locked after it has tilted the lifting blade up, it then acts as a coupling rod which, on the one hand, supports the lifting blade against tilting down under load and, on the other hand, forms a guide by means of its ball-joint bearing constructed at one end on the chassis and at the other end on the lifting blade when, during cornering, the nosewheel forces the lifting blade to be set obliquely or to pivot about an imaginary longitudinal axis passing through the centerpoint of the ball joint holding the lifting blade centrally at the top. If there is only a single fluid piston-cylinder unit which acts centrally on the lifting blade above or below the ball joint, there is additionally a lateral longitudinal coupling rod which prevents any pivoting of the lifting blade about the vertical axis which would otherwise be possible.

According to a preferred embodiment, two fluid piston-cylinder units are provided, which are arranged symmetrically relative to one another and are coupled to the lifting blade 8 below the ball joint 25 which acts in the upper region of the lifting blade 8 (FIGS. 1–7).

The invention is explained in greater detail below with reference to an exemplary embodiment illustrated in the drawing, in which:

FIG. 1 shows an illustrative view of the towing vehicle according to the invention obliquely from the front and from the top with the gripping and drawing-in device pivoted in;

Figure 1:
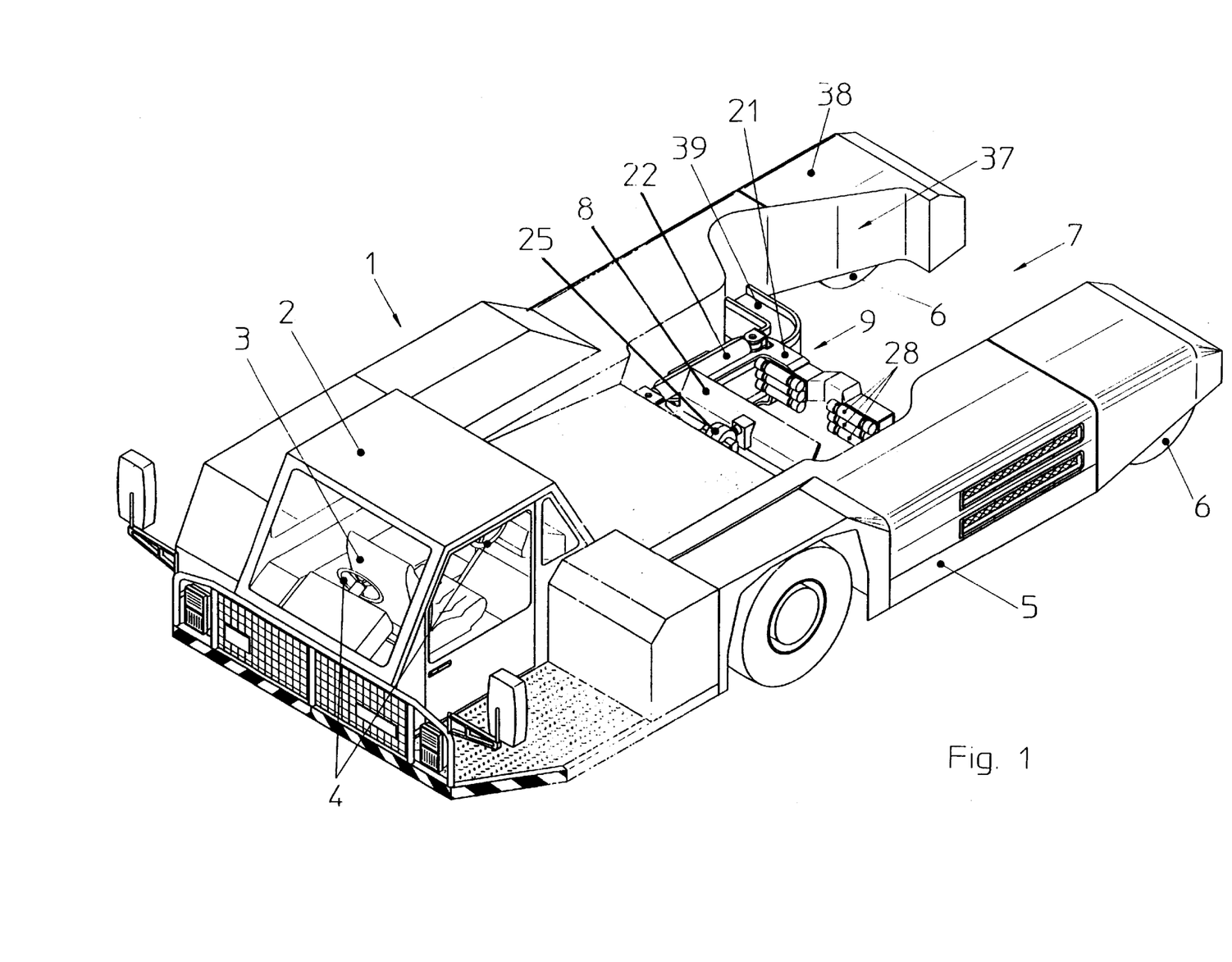
Figure 4:
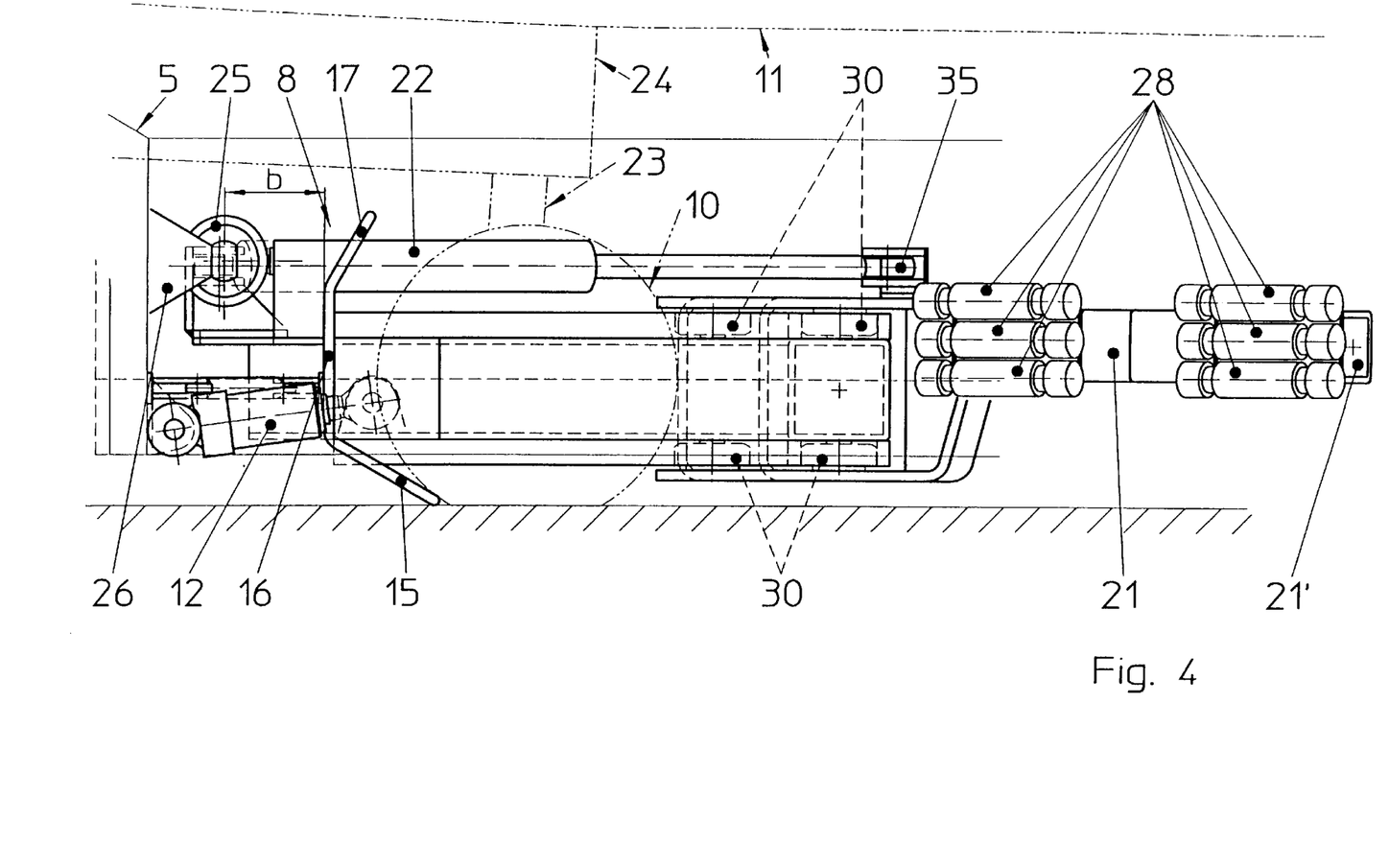
FIG. 4 shows a side view of the lifting blade in the direction of the arrow B in FIG. 2 with the gripping and drawing-in device in the open position, and of the suspension of the lifting blade on the chassis of the towing vehicle.

According to FIG. 1, the towing vehicle 1 shown has a driver's cab 2 with a turning seat 3 and two steering devices 4, so that the driver is always able to steer in the direction of travel regardless of whether travel is respectively forwards or backwards. The chassis 5 of this towing vehicle 1 has a fork-like receiving area 7 between the wheels 6 of one axle which are suspended independently of one another, in which receiving area there is arranged a retractable and extensible gripping and drawing-in device 9 which is fastened to a lifting blade 8 and by means of which the nosewheel 10 of an aircraft 11 can be gripped (FIGS. 1 and 4). During the gripping of the nosewheel 10, the latter can be drawn onto the lifting blade 8 which is pivotable relative to the chassis 5 both about a transverse axis 14 and, for matching to oblique positions of a nosewheel 10 which as been accommodated, about a longitudinal axis 13. The pivoting of the lifting blade 8 takes place by means of two fluid piston-cylinder units 12 arranged symmetrically relative to one another between the chassis 5 and the lifting blade 8. As shown particularly clearly in FIGS. 4 and 5, the lifting blade 8 is of angled design in cross-section, specifically with a run-up ramp 15, which can be lowered down to the ground, a supporting wall 16 and a holding-down wall 17. As can be seen from FIG. 2, the lifting blade is reinforced laterally to form abutments 18, at which the fluid piston-cylinder units 12 are coupled to the chassis 5 on the piston side via axle bearing 19 and on the cylinder side via axle bearing 20.

Figure 2:
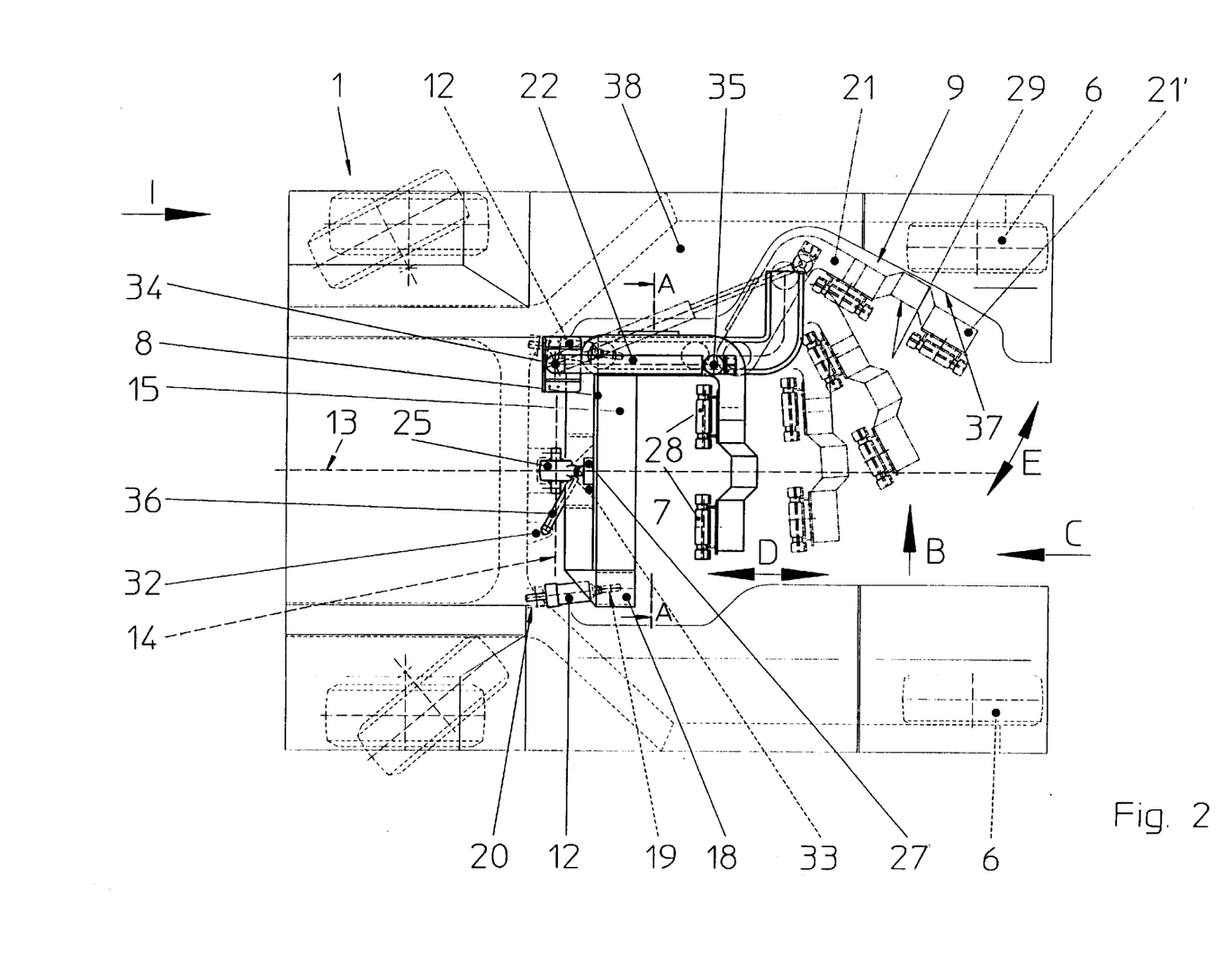
FIG. 2 shows a plan view of the towing vehicle according to FIG. 1 with different positions of the gripping and drawing-in device on an enlarged scale.

Fastened to one side of the lifting blade 8 (this side is illustrated at the top in the plan view according to FIG. 2) is an angular link 39 for the controlled guiding of a bent lever 21 which is retractable and extensible by means of a piston-cylinder unit 22 in the direction of the double arrow D (FIG. 2) and additionally is also pivotable in the direction of the double arrow E. Together these elements form the gripping and drawing-in device 9 for the nosewheel 10, which can be seen in FIG. 4 and 5, of an aircraft 11 which is indicated with its lower contour in dot/dash lines in FIG. 4. The associated nose-wheel support is indicated at 23, and the open cover of the landing-gear shaft at 24.

According to the invention, the lifting blade 8 is coupled so as to be pivotable in all directions by means of a ball joint 25 which is fastened to the chassis 5 of the towing vehicle 1 and acts centrally on the back of the lifting blade 8, in the preferred embodiment shown in its upper region (FIGS. 2 and 4). The ball joint is fastened to the chassis 5 by a bearing mount 26 and to the rear wall of the lifting blade by a bearing mount 27 arranged there.

The method of operation is as follows:

The towing vehicle 1, with the gripping and drawing-in device 9 in the open position illustrated in FIG. 2, moves in the direction of the arrow I towards the aircraft 11 until the nosewheel 10 is in the position illustrated in FIG. 4 in contact with the run up ramp 15 of the lifting blade 8. The path of the nosewheel in the direction of the arrow C into the fork-like receiving area 7 is made possible by the bent lever 21 in its position illustrated by solid lines in FIG. 2 by the fact that the bent lever is located in a correspondingly angular recess 37 in the cantilever arm 38, into which recess it can be pivoted with the aid of the piston-cylinder unit 22. In this case, the angular link guide 39 forms restricted guidance in which the bent lever 21 can then be pivoted back again in order to come to rest against the nosewheel 10 by means of triple rollers 28. In this case, the bent lever 21 is illustrated by dot/dash lines in various different positions or settings in FIG. 2 which it can assume infinitely variably when being pivoted in and out. As soon as the triple rollers 28 have come to rest against the nosewheel 10, during further retraction of the piston-cylinder unit 22 the nosewheel 10 can be pushed up the run-up ramp 15 up to the stop on the supporting wall 16. At this point it should be noted that the exemplary embodiment shown is provided for double nosewheels 10 as shown by the presence of two sets of triple rollers 28 which rest in each case against one tire of the double nosewheel 10. The indentation 29 in the bent lever serves to allow space for the crossbar (not shown) of the nosewheel 10.

Figure 3:
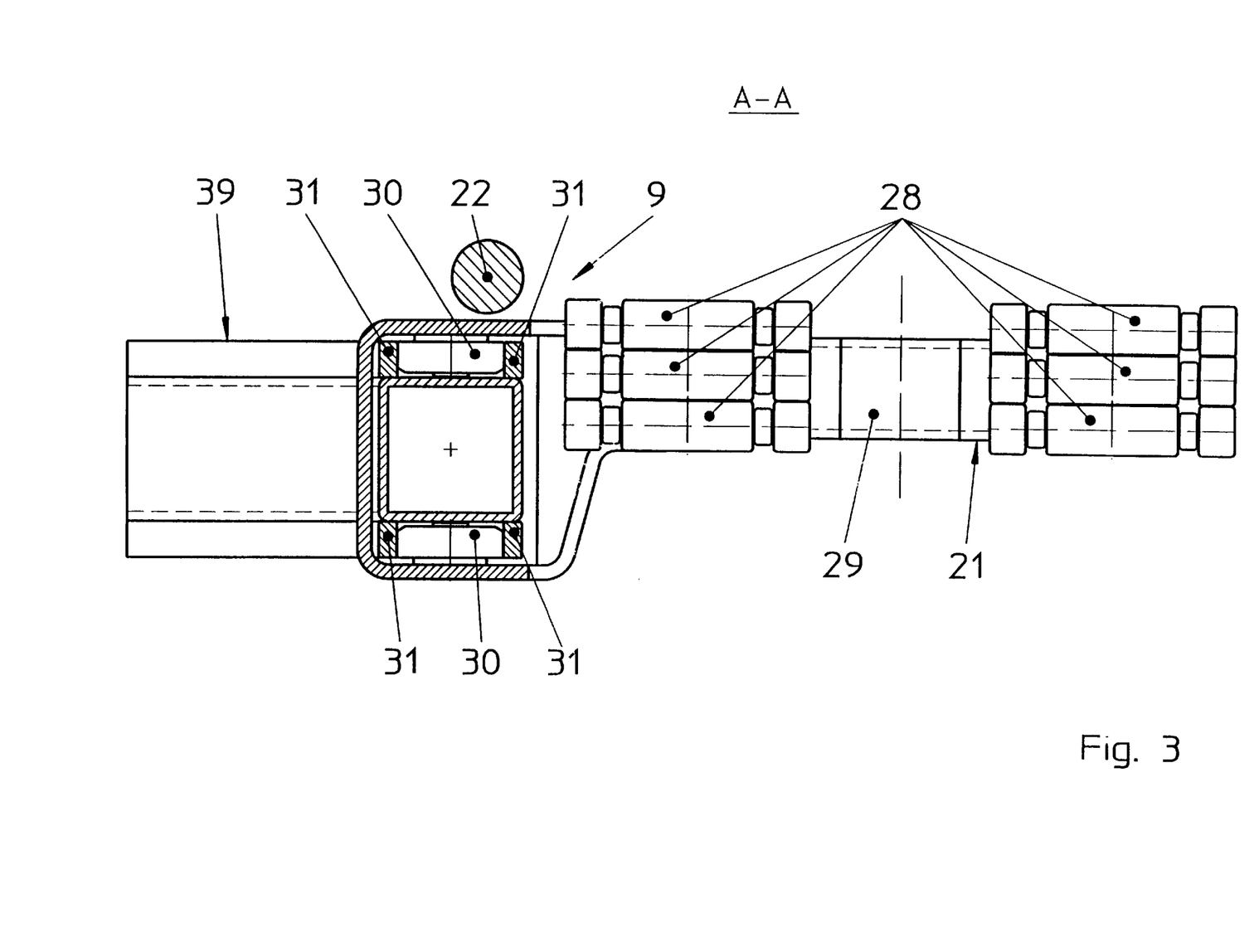
FIG. 3 shows a section on the line A—A in FIG. 2 to illustrate details of the gripping and drawing-in device on a further enlarged scale.

A preferred type of link guide can be seen, in particular, in FIG. 2 and the sectional view in FIG. 3. Accordingly, two upper and lower rollers 30 located coaxially one above the other are provided in each case on the bent lever 21 and are guided by the upper and lower rails 31 of the link 39. As can be seen, the link guide 39 on the one hand and the bent lever 21 on the other hand form angles which open in opposite directions to one another, preferably right angles. It is obvious that a second gripping and drawing-in device of the type described could be located symmetrically on the other side of the lifting blade 8, the bent levers 21 naturally only being allowed to extend at the maximum up to the longitudinal center-plane 13.

Figure 5:
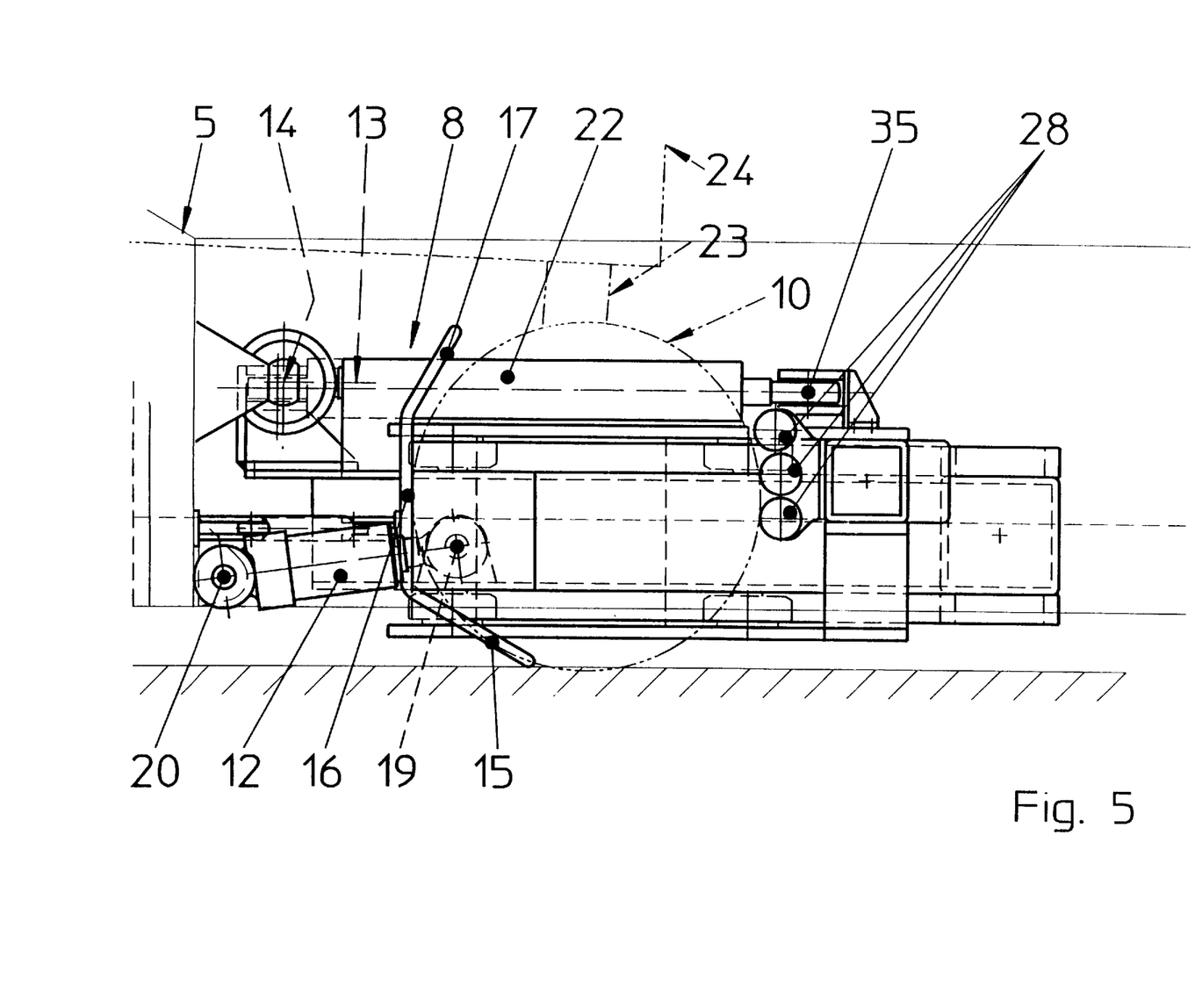
FIG. 5 shows a side view corresponding to FIG. 4 with the gripping and drawing-in device closed and with a nosewheel, illustrated by dot/dash lines, gripped between the lifting blade and the gripping and drawing-in device.

From the position of the lifting blade 8 with its gripping and drawing-in device 9 shown in FIG. 5, the said lifting blade is then pivoted up in the direction of the double arrow F by actuating the fluid piston-cylinder units 12 in such a way that the nosewheel 10 and thus the aircraft 11 are raised correspondingly.

Figure 6:
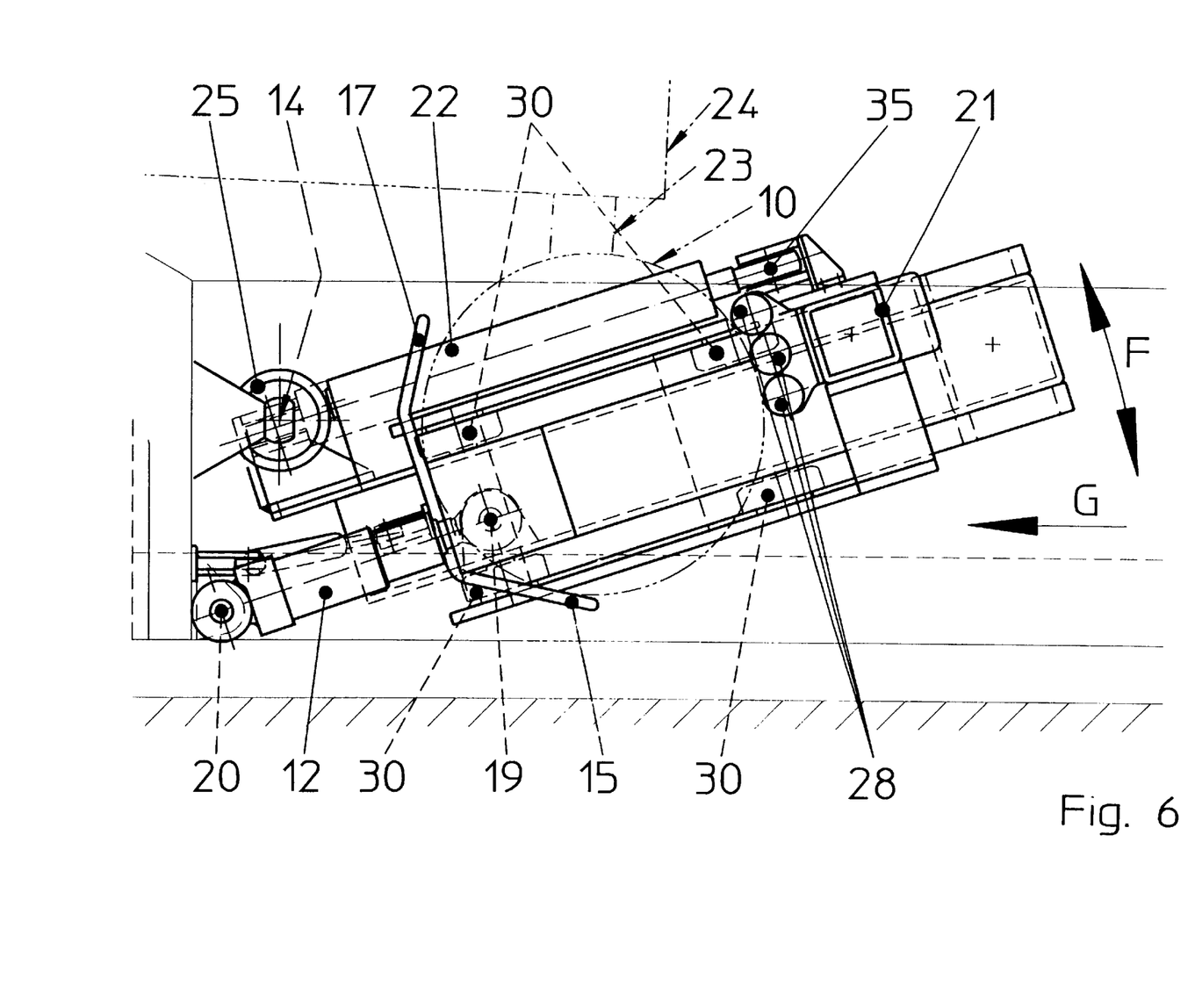
FIG. 6 shows a side view corresponding to FIGS. 4 and 5 with the lifting blade pivoted up in addition to the gripping and drawing-in device with the nosewheel raised due to the upward tilting.

According to the invention, the two fluid piston-cylinder units 12 can now be mechanically locked in the extended position shown in FIG. 6 raising the lifting blade 8, which is not shown in detail. This avoids any abrupt lowering of the lifting blade in the event of a sudden pressure drop in the hydraulic system for whatever reason with adverse consequences both for the aircraft on the one hand and for the towing vehicle itself on the other hand.

Figure 7:
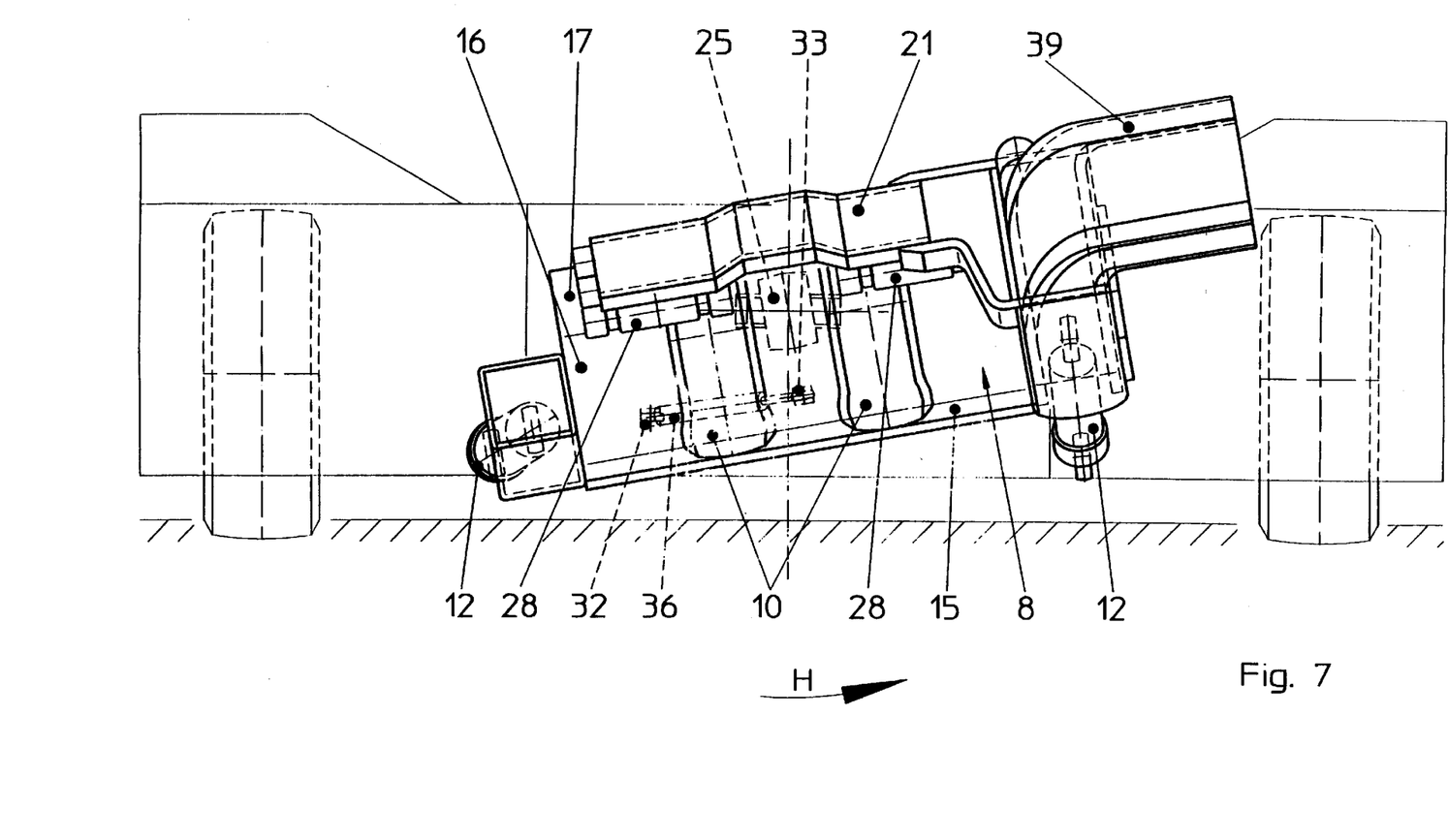
FIG. 7 shows a rear view in the direction of the arrow G in FIG. 6 to illustrate the lifting blade and gripping and drawing-in device in a position gripping a double nosewheel, holding the latter raised, and in an oblique position during cornering.

FIG. 7 shows a detail from a rear view in the direction of the arrow G in FIG. 6 during cornering of the vehicle 1, specifically towards the left with a double nosewheel 10 which has been accommodated. Owing to the mechanical locking, as mentioned, the units 12 take on the function of longitudinal steering means which are of fixed length, which requires axle bearings 19 and 20 (FIG. 2) in the form of ball joints. FIG. 7 shows how the units 12 follow in the event of a deflection (shown here in the direction of the arrow H), in the case of deflection in the opposite direction naturally in a reversed direction accordingly. The guidance takes place, of course, by means of the double nosewheel 10, in which case it is clear that, without a nosewheel, for example when moving the towing vehicle according to FIG. 1 to an aircraft to be towed or away from an aircraft which has already been towed, back and forth pivoting of the blade 8 with the gripping and drawing-in device 9 could take place if there were not a supporting coupling rod 36 present in the form of a piston-cylinder unit (FIGS. 2 and 7) which, as a type of crossbar, ensures stability of the arrangement, as long as the towing vehicle is not loaded, as mentioned. After the nosewheel 10 has been loaded and has taken over the guidance, the piston-cylinder unit 36 is naturally relieved of pressure in order to be able to follow every movement of the arrangement brought about by the nosewheel 10. The coupling, at one end to the chassis 5 at 32 and at the other end to the blade 8 at 33, can be seen particularly clearly in FIG. 2.

The coupling of the piston-cylinder unit 22, at one end to the link 39 at 34 and at the other end to the bent lever 21 at 35, is shown in the same Figure. Instead of being coupled to the link 39, such coupling to the lifting blade 8 is also possible.

Figure 8:
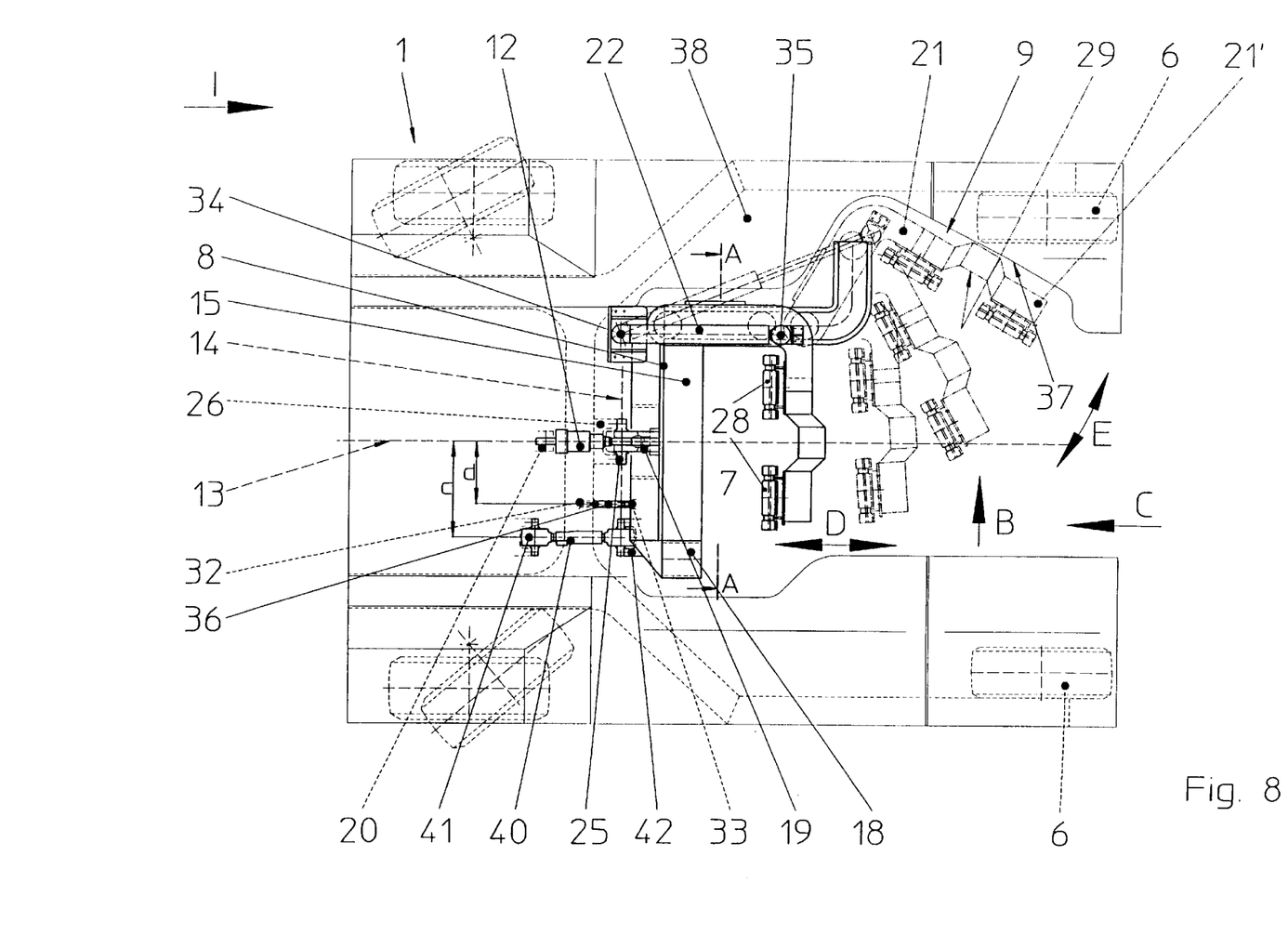
FIG. 8 shows a plan view corresponding to FIG. 2 of a second embodiment.
Figure 9:
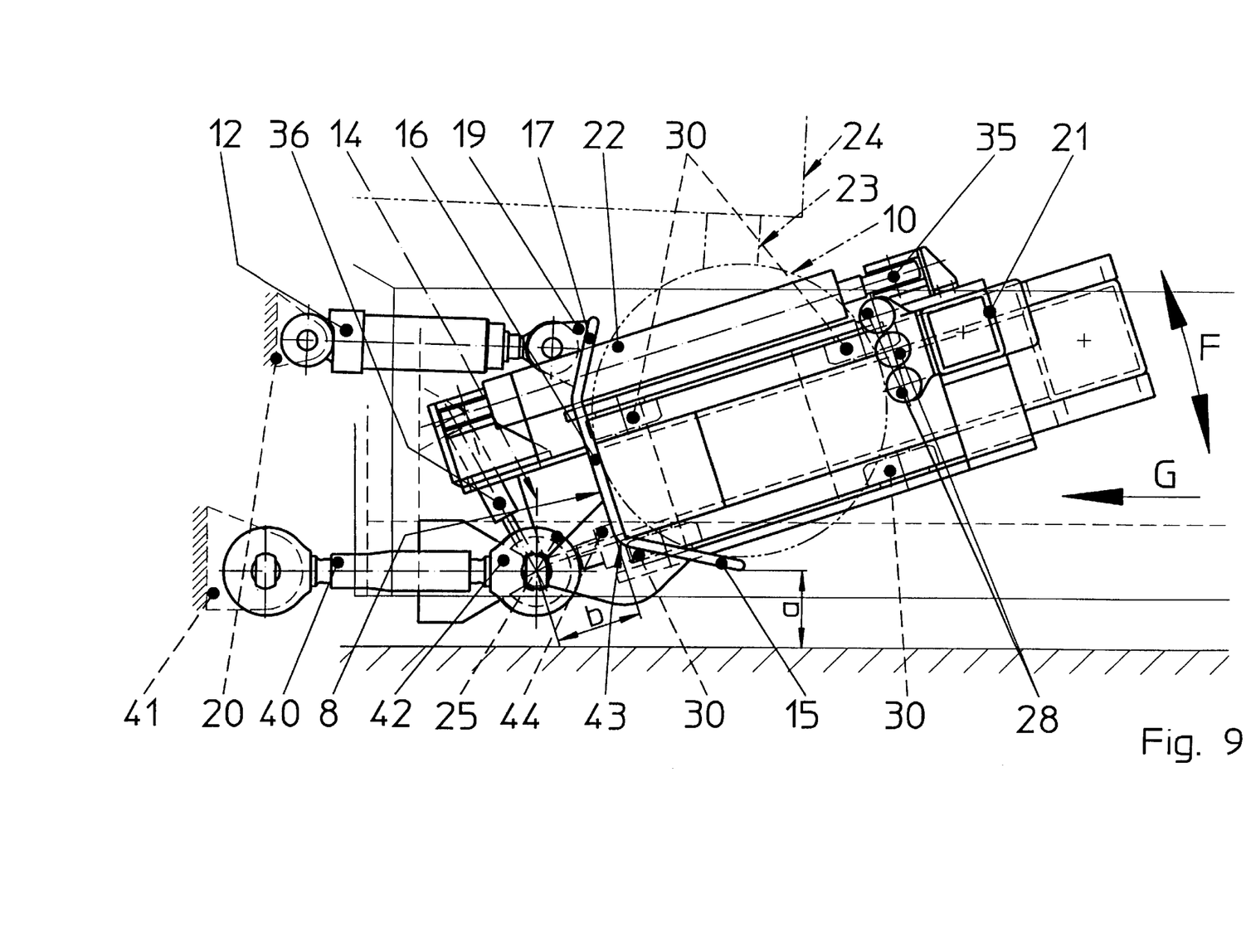
FIG. 9 shows a side view corresponding to FIG. 6 of the second embodiment according to FIG. 8.

In the second embodiment illustrated in FIGS. 8 and 9, the same parts are given the same reference numerals in each case compared to the first embodiment.

The difference from the first embodiment consists mainly in the fact that here the ball joint 25 is provided in the lower region of the lifting blade and the fastening of the ball joint 25 to the chassis 5 is located correspondingly lower, whereas the fluid piston-cylinder unit 12, specifically here only a single unit of this type, engages on the holding-down wall 17 and thus in the upper region of the lifting blade 8, consequently above the ball joint 25. It is obvious that more or less the same kinematic effect of the lifting blade thus results when it is tilted about the transverse axis 14 running through the ball joint 25, but the fact must not be overlooked that the different engagement of the ball joint 25 on the lifting blade 8 results in different raising paths or distances of the run-up ramp 15 from the ground up to the raised positions shown in FIGS. 6 and 9. Assuming the same angle of tilt, a greater distance of the run-up ramp 15 of the lifting blade 8 from the ground naturally results in the firstmentioned embodiment according to FIGS. 1 to 7 than in the case of the second embodiment according to FIGS. 8 and 9. This is due quite simply to the greater distance of the run-up ramp 15 from the ball joint 25 in the first embodiment compared to the said distance in the second embodiment.

In order now to increase this distance, as shown in FIG. 9, a support 44 which bears the ball joint 25 can be arranged in the lower region of the lifting blade 8, preferably in the region of the crease edge 43 between the run-ramp 15 and the supporting wall 16. The greater the distance is between the lifting blade 8 and the ball joint 25, i.e. the more the tilting of the lifting blade 8 in the direction of the double arrow F becomes a pivoting motion, the greater the distance a between the ground and the lower edge of the run-up ramp 15 can become.

At this point, it should be noted that, even in the first embodiment, there is already a distance b (FIG. 4) between the supporting wall 16 and the ball joint 25. However, as mentioned, this distance is of particular importance in the embodiment according to FIGS. 8 and 9.

This embodiment is consequently advantageous because it has only a single fluid piston-cylinder unit 12 to move the lifting blade. This is arranged expediently in a vertical longitudinal center-plane 13 which is common to the ball joint 25, in this case above the ball joint 25. Furthermore, at least one longitudinal coupling rod 40 provided laterally at a distance c from the ball joint 25 is coupled at one end via a first bearing 41 to the chassis 5 and, at the other end, via a second bearing 42 to the lifting blade 8. Since the second bearing 42 is expediently seated on the transverse axis 14 of the lifting blade 8 running through the ball joint 25, no lateral deflecting about the vertical axis can occur at all. In order also to prevent raising or lowering of the one side of the lifting blade 8 in relation to the other which would otherwise be possible, a fluid piston-cylinder unit forming a supporting steering means 36 in the angled state is again coupled at one end to the chassis 5 and at the other end to the lifting blade 8. Since this supporting steering means is intended precisely to prevent any lowering or raising of one side of the lifting blade 8, it is expediently installed at least approximately vertically, as can be seen in FIG. 9. In order to be able to fulfill its function, the supporting steering means 36 must naturally likewise have a lateral distance d (FIG. 8) from the ball joint 25.

I claim:

1. Towing vehicle for maneuvering aircraft without a towbar, the chassis (5) of which vehicle has a fork-like receiving area between the wheels of a coaxial wheel suspension, in which receiving area there is arranged a retractable and extensible gripping and drawing-in device which is fastened to a lifting blade and by means of which the nosewheel of an aircraft can be gripped and drawn onto the lifting blade which is pivotable relative to the chassis both about a transverse axis and, for matching to oblique positions of a nosewheel which has been received, about a longitudinal axis by means of two fluid piston-cylinder units arranged symmetrically relative to one another between the chassis and the lifting blade, characterized in that the lifting blade is coupled so as to be pivotable in all directions by means of a ball joint which is fastened to the chassis of the towing vehicle and acts centrally on the back of the lifting blade, and in that at least one fluid piston-cylinder unit, acting on the lifting blade above or below the ball joint at a distance from the latter, can be locked and released in a position which raises the lifting blade.

2. Towing vehicle according to claim 1, characterized in that two fluid piston-cylinder units are provided, which are arranged symmetrically relative to one another and are coupled to the lifting blade below the ball joint which acts in the upper region of the lifting blade.

3. Towing vehicle according to claim 1, characterized in that, if only a single fluid piston-cylinder unit is arranged above or below the ball joint in a vertical longitudinal center-plane which is common to the ball joint, at least one longitudinal steering means, provided laterally at a distance from the ball joint, is coupled at one end via a first bearing to the chassis and, at the other end, via a second bearing to the lifting blade.

4. Towing vehicle according to claim 3, characterized in that the second bearing is seated on the transverse axis of the lifting blade running through the ball joint.

5. Towing vehicle according to one of the preceding claims, characterized in that a fluid piston-cylinder unit forming a supporting steering means in the locked state is coupled at one end to the chassis and at the other end to the lifting blade.

6. Towing vehicle (1) for maneuvering aircraft (11) without a towbar, the chassis (5) of which vehicle has a fork-like receiving area (7) between wheels (6) of a coaxial wheel suspension, in which receiving area there is arranged a retractable and extensible gripping and drawing-in device (9) which is fastened to a lifting blade (8) and by means of which a nosewheel (10) of an aircraft (11) can be gripped and drawn onto the lifting blade (8), characterized in that the gripping and drawing-in device (9) fastened to the lifting blade (8) comprising at least one angular link guide (39), arranged on one side of the lifting blade (8), and a bent lever (21) which is controlled by the said link guide and, to grip the nose-wheel (10), can be pivoted by means of a piston-cylinder unit (22) into the free region of the fork-like receiving area (7) taken up by the nosewheel and, to release the nosewheel, can be pivoted out of the said region again, the link guide and the bent lever forming angles which open in opposite directions to one another, and that at each cantilever arm (38) correlated to a link guide (39) a respective angularly shaped recess (37) is provided into which the bent lever (21) can pivot so that the pivot angle between gripping and releasing positions is less than 90°.

7. Towing vehicle (1) for maneuvering aircraft (11) without a towbar, the chassis (5) of which vehicle has a fork-like receiving area (7) between wheels (6) of a coaxial wheel suspension, in which receiving area there is arranged a retractable and extensible gripping and drawing-in device (9) which is fastened to a lifting blade (8) and by means of which a nosewheel (10) of an aircraft (11) can be gripped and drawn onto the lifting blade (8) which is pivotable relative to the chassis (5) both about a transverse axis and, for matching to oblique positions of the nosewheel (10) which has been received, about a longitudinal axis by means of two fluid piston-cylinder units (12) arranged symmetrically relative to one another between the chassis (5) and the lifting blade (8), characterized in that the lifting blade (8) is coupled so as to be pivotable in all directions by means of a ball joint (25) which is fastened to the chassis (5) of the towing vehicle (1) and acts centrally on the back of the lifting blade (8), and in that at least one fluid piston-cylinder unit (12), acting on the lifting blade (8) above or below the ball joint (25) at a distance from the latter, can be locked and released in a position which raises the lifting blade (8), in that the gripping and drawing-in device (9) fastened to the lifting blade (8) comprises at least one angular guide (39), arranged on one side of the lifting blade (8), and a bent lever (21) which is controlled by the said link guide and, to grip a nose-wheel (10), can be pivoted by means of a piston-cylinder unit (22) into the free region of the fork-like receiving area (7) taken up by the nosewheel and, to release the nosewheel, can be pivoted out to the said region again, the link guide and the bent lever forming angles which open in opposite directions to one another, and that at each cantilever arm (38) correlated to a link guide (39) a respective angularly shaped recess (37) is provided into which the bent lever (21) can pivot so that the pivot angle between gripping and releasing positions is less than 90°.

8. Towing vehicle (1) according to claim 6 or 7, characterized in that the angularly shaped recess (37) is arranged in a cantilever arm (38) substantially in front of the axle of wheels (6).

9. Towing vehicle (1) according to claim 6 or 7, characterized in that the free end (21') of the bent lever (21) has at least one roller (28) for contact with the nosewheel (10).

* * * * *